US008341546B2

(12) United States Patent
Winter

(10) Patent No.: US 8,341,546 B2
(45) Date of Patent: Dec. 25, 2012

(54) METHOD FOR VISUALIZING A CHANGE CAUSED BY SCROLLING IN A SCROLLING DIRECTION OF A SECTION OF A TEXT AND/OR GRAPHIC DISPLAYED ON AN OPTICAL DISPLAY MEANS

(75) Inventor: Marco Winter, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 748 days.

(21) Appl. No.: 12/448,785

(22) PCT Filed: Dec. 20, 2007

(86) PCT No.: PCT/EP2007/064306
§ 371 (c)(1),
(2), (4) Date: Jul. 7, 2009

(87) PCT Pub. No.: WO2008/083909
PCT Pub. Date: Jul. 17, 2008

(65) Prior Publication Data
US 2010/0050113 A1 Feb. 25, 2010

(51) Int. Cl.
*G06F 3/048* (2006.01)
(52) U.S. Cl. .......................... 715/787; 715/785; 715/786
(58) Field of Classification Search .................. 715/767, 715/784–787
See application file for complete search history.

(56) References Cited

U.S. PATENT DOCUMENTS

| 6,476,831 B1 | 11/2002 | Wirth et al. | |
| 7,770,130 B1 * | 8/2010 | Kaptelinin | 715/787 |
| 2009/0138815 A1 * | 5/2009 | Mercer | 715/786 |

FOREIGN PATENT DOCUMENTS
WO    WO 02/071199    9/2002

OTHER PUBLICATIONS
Search Report Dated Dec. 18, 2008.

* cited by examiner

*Primary Examiner* — Ba Huynh
(74) *Attorney, Agent, or Firm* — Tutunjian & Bitetto, P.C.

(57) ABSTRACT

The invention relates to a method for visualizing a change caused by scrolling in a scrolling direction of a section of a text and/or graphic displayed on an optical display means. A visible marking is thereby displayed at a first position within the displayed section. A visible marking is displayed at a second position within a section displayed during the scrolling prior to or as soon as the first position is no longer within the section displayed during the scrolling in response to the scrolling. In particular with small screens, which are increasingly used for displaying information, which can be visually captured, for example in personal digital assistants, which are referred to as PDAs, or in mobile cellular telephones, the method makes it possible to increase the capability of capturing the displayed information and to thus increase the field of application of these devices.

9 Claims, 4 Drawing Sheets

Figure 1:
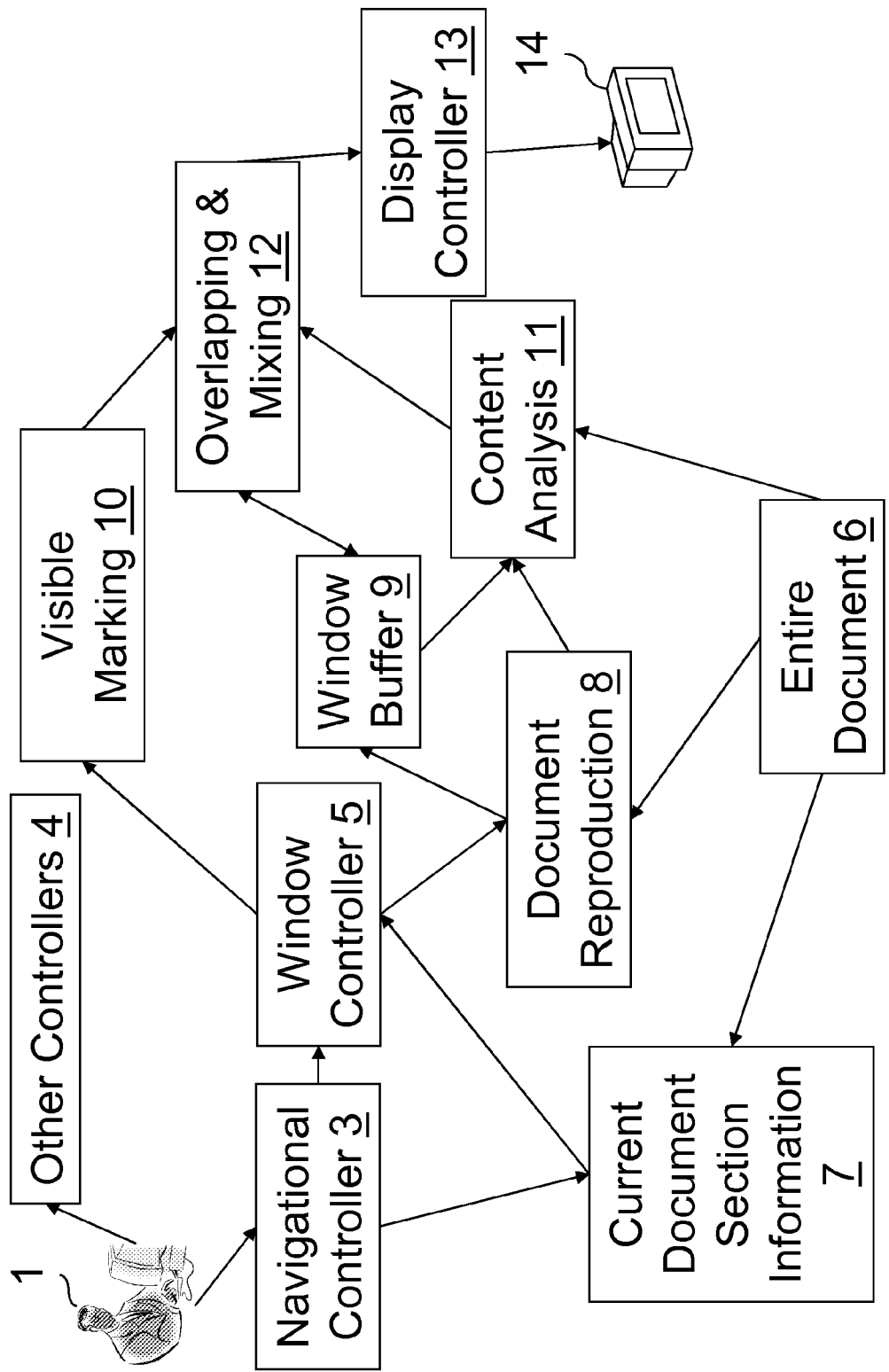

METHOD FOR VISUALIZING A CHANGE CAUSED BY SCROLLING IN A SCROLLING DIRECTION OF A SECTION OF A TEXT AND/OR GRAPHIC DISPLAYED ON AN OPTICAL DISPLAY MEANS

This application claims the benefit, under 35 U.S.C. §365 of International Application PCT/EP2007/064306, filed Dec. 20, 2007, which was published in accordance with PCT Article 21(2) on Jul. 17, 2008 in English and which claims the benefit of German patent application No. 102007002074.2, filed Jan. 9, 2007.

The invention relates to a method for visualizing a change caused by scrolling in a scrolling direction of a section of a text and/or graphic displayed on an optical display means, which can be used, for example, in devices comprising small screens, such as personal digital assistants, which are referred to as PDAs, or mobile cellular telephones.

Due to the size of the text and of the graphic, respectively, the display of a text and/or of a graphic on an optical display means is frequently limited to the display of a text and/or graphic section in a window. The window can thereby fully or partially fill the optical display means. With a multi-page text document, only one page of the text is frequently displayed and during the course of a computer game, only a section of the virtual game world is displayed sometimes. To change the displayed text and/or graphic section, provision is frequently made for a scrolling mechanism, with which the window can be scrolled relative to the text and/or the graphic. The scrolling mechanism allows a user to scroll the window, in particular horizontally, vertically or diagonally relative to the text and/or to the graphic and to thus effect the display of a different text and/or graphic section on the display means. During the scrolling of the window, the respective text and/or graphic section is thereby continuously displayed on the display means.

If the scrolling speed during the scrolling of the window is low, that is, if the displayed section changes only slowly, the user is able to capture the information temporarily displayed on the optical display means during the scrolling. However, with long texts or complex graphics, it will then take a long time for the window to be scrolled from one end of the text and the graphic, respectively, to another end of the text and the graphic, respectively.

However, if the scrolling speed is high, it becomes difficult for the user to always completely capture the information temporarily displayed in the window during the scrolling. This is substantially due to the fact that it becomes difficult for the user to track information on its way through the window.

If, for example, a text is formatted in a centered justification and is not structured in a left justification by means of formatting, it is easy for a user to lose the line, which he is reading during the scrolling.

If, for example, the display means is a relatively small screen, as it is used with PDAs or mobile cellular telephones, for example, information is displayed on the screen only briefly. If a user loses the visual fixation of a line which he is reading, it may easily occur with small screens that this line is no longer a part of the displayed section, prior to the user having been able to completely capture the content of this line. The user then loses a portion of the information. This can make it impossible to completely comprehend the text and the graphic, respectively.

It thus becomes the object of specifying a method, which improves the capability of capturing a text and/or graphic displayed in sections on a display means during a change of the displayed section by means of scrolling.

This object is solved according to the invention by means of a method for visualizing a change caused by scrolling in a scrolling direction of a section of a text and/or graphic displayed on an optical display means comprising the features of claim 1.

According thereto, provision is made for a visible marking to be displayed at a first position within a section displayed at the onset of the scrolling. At a second position, a visible marking is displayed within a section displayed during the scrolling, prior to or as soon as the first position is no longer within the section displayed during the scrolling.

It is thus ensured that a marking is always displayed during the scrolling. The respectively displayed marking allows the user to track information on its way through the window, because the relative position of the information to the marking is constant and because the tracking of the marking is comparatively easy for the user. The user is thus enabled to quickly scroll the window relative to a text and/or a graphic and, at the same time, to capture information temporarily displayed in the window during the scrolling.

Advantageously, the marking is a line, an underlined, framed or highlighted text section or a visually distinctive object, for example, in the area of the text and graphic edge, respectively. That is to say, the marking can then be visually captured particularly well.

In another advantageous development, the marking is removed shortly prior to being scrolled from the window or after a first time interval, for example by means of blanking out or fading out. It can thus be made clear to the user that the marking is a visualization aid and is not part of the text and of the graphic, respectively.

In yet another advantageous development, the marking is removed if the user does not create a scrolling command within a second time interval. This also makes it clear to the user that the marking is only a visualization aid.

Advantageously, at the onset of the scrolling, the currently displayed section is analyzed in the process with regard to the presence of at least one sufficiently distinct element and a visible marking is displayed at the first position only if the section displayed at the onset of the scrolling does not encompass a sufficiently distinct element. In a further advantageous embodiment, the section displayed during the scrolling is analyzed during the process with regard to the presence of at least one sufficiently distinct element and a visible marking is displayed at the second position only if the section displayed during the scrolling does not encompass a sufficiently distinct element. In addition, it is advantageous to analyze the section displayed at the onset of the scrolling as well as the section displayed during the scrolling. A sufficiently distinct element can take over the role of a text and graphic-immanent marking for the visualization. If an additional marking is not required for the capability to capture the text and/or the graphic, the display can occur without changes.

The unchanged display is also possible if the scrolling speed is low. It is thus considered to be an advantageous development to compare the scrolling speed with a maximum speed and to display a marking only if the scrolling speed exceeds the maximum speed, for example over a certain period.

If the text and/or the graphic are displayed by means of pixels, which are disposed in rows and/or lines, the analysis of the luminance value of the pixels is sufficient in response to a black/white display. However, if additional or other colors are used for the display, it is considered to be advantageous to separately analyze the corresponding chrominance components, e.g. RGB or YUV. However, in the majority of cases, a mere luminance value analysis also provides good results, even with colored images. Advantageously, the text and/or the graphic are completely analyzed prior to the scrolling and/or during scrolling pauses, so as to avoid extensive computations during the scrolling.

The section displayed at the onset and/or during the scrolling can thereby be analyzed with regard to the presence of at least one sufficiently distinct element by means of at least one Fourier transformation parallel to the direction of scrolling and/or by means of at least one autocorrelation parallel to the direction of scrolling, for example. That is to say, the self-similarity of the displayed section in the direction of scrolling and thus the difficulty of the capability of capturing the information available in the displayed section can be determined by means of the at least one Fourier transformation and/or by means of the at least one autocorrelation. If, for example, the window is scrolled vertically upwards or downwards relative to the text and/or to the graphic, the similarity of different lines to one another can be determined. That is to say, if lines located particularly close to one another are very similar to one another, the danger is particularly high for the user to confuse the lines and to thus lose the fixation.

The text and/or the graphic can be analyzed in a particularly rapid and accurate manner with regard to the presence of at least one sufficiently distinct element, if a plurality of one-dimensional Fourier transformations are computed parallel to the direction of scrolling and/or if one-dimensional autocorrelations are computed parallel to the direction of scrolling. Fourier transformations and/or autocorrelations are determined and used for the analysis, for example, column by column in response to the vertical scrolling for a plurality of columns and line by line in response to the horizontal scrolling for a plurality of lines.

It is considered to be advantageous if the section displayed at the onset and during the scrolling is made up of pixels and if a characteristic strength of at least a low frequency is determined by means of the at least one Fourier transformation. The at least one low frequency thereby has a period length in pixels, which is, for example, at least twice as large as the number of pixels in the direction of scrolling of the section displayed at the onset and during the scrolling, respectively. The presence of at least one distinct element is then determined by means of a comparison of the characteristic strength of the at least one low frequency with a first threshold value, because the content of a section is more distinct, the more pronounced the low frequencies.

Furthermore, the characteristic strength of high frequencies, the period lengths of which in pixels are, for example, up to a twentieth of the number of pixels in the direction of scrolling of the section displayed at the onset and during the scrolling, respectively, can also be used for determining the presence of at least one distinct element in an advantageous manner.

In an advantageous further embodiment, a characteristic strength of at least one large pixel distance is determined by means of the at least one autocorrelation. The number of pixels of the at least, for example, one large pixel distance is thereby at least one twentieth of the number of pixels in the direction of scrolling of the section displayed at the onset and during the scrolling, respectively. The presence of at least one distinct element is then determined by means of a comparison of the characteristic strength of the at least one large pixel distance by means of a second threshold value. That is to say that the fact that the section content is more distinct, the higher the characteristic of the large pixel distances, applies for large pixels.

In an advantageous manner, the characteristic strength of small pixel distances, which is, for example, less than one twentieth of the number of pixels in the direction of scrolling of the section displayed at the onset and during the scrolling, respectively, can be used for determining the presence of at least one distinct element. The fact that the characteristic of small pixel distances is significantly greater than 0% and significantly smaller than 100%, if a distinct element is present in a section, can thereby be taken advantage of.

With a text comprising characters and/or with a graphic comprising characters, another advantageous embodiment provides for the allocation of a value to at least a first character in the text and/or in the graphic and for the allocation of the same or a different value to a second character in the text and/or in the graphic for the purpose of reducing the computation effort, and for the analysis with regard to the presence of at least one sufficiently distinct element to be carried out by means of the allocated values.

In a further embodiment, the characters are displayed by means of a first number of pixels in a first color and by means of a second number of pixels in a second color, wherein the term color also includes black and white. In the process, the value allocated to a character is then a function of the first number used for the display of the character and/or of the second number used for the display of the character.

The computation effort can be further reduced if a fixed value which does not equal zero is allocated to a character if and only if the first number of pixels used for the display of the character is greater than zero.

Figure 2:
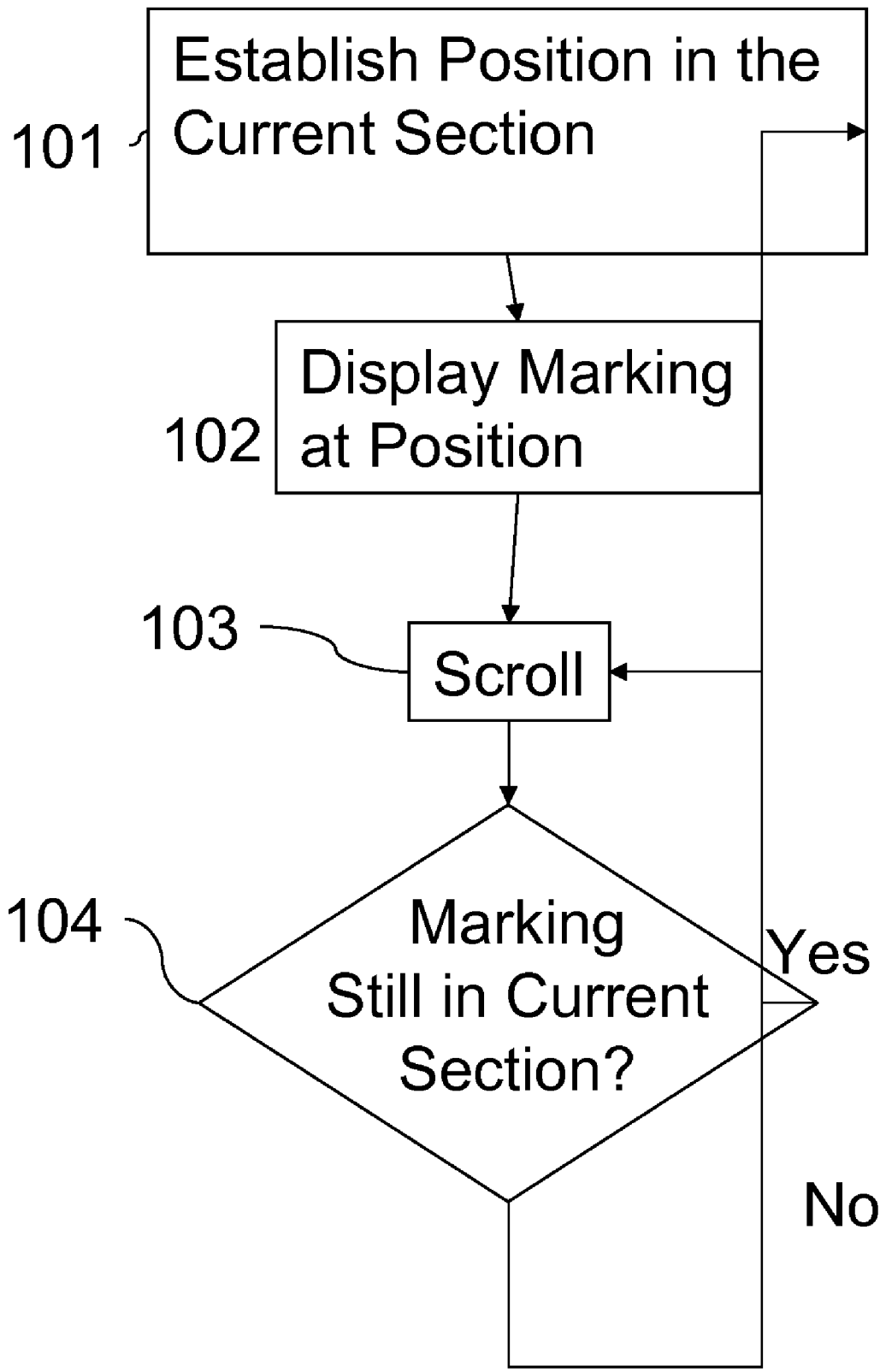
Figure 3:
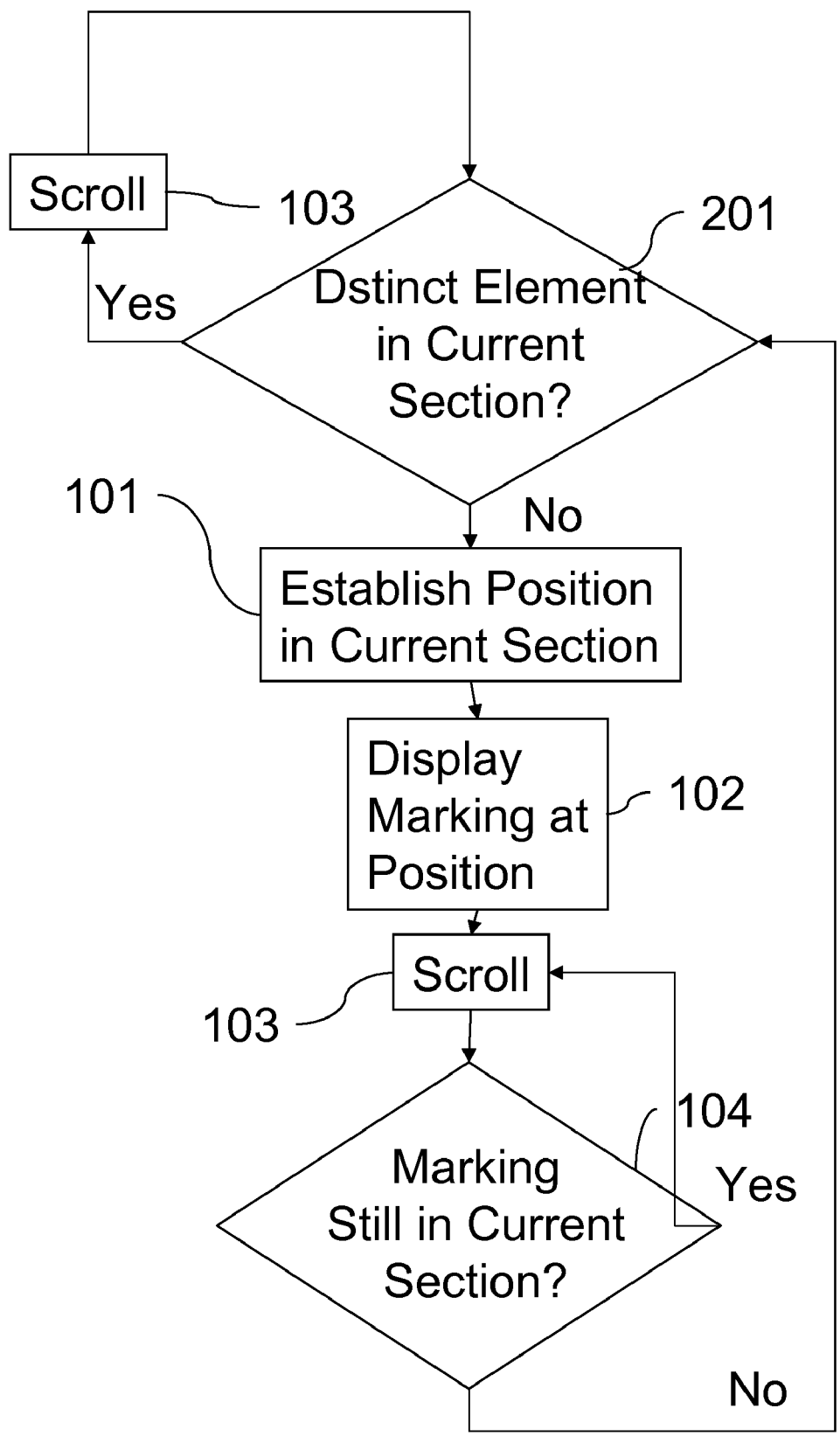

Possible embodiments of the invention are illustrated in the figures in an exemplary manner. Shown is thereby in FIG. 1 a relational diagram for an exemplary system structure, which is suitable for carrying out the claimed method;

FIG. 2 a flowchart for an exemplary embodiment of the claimed method;

FIG. 3 a flowchart for another exemplary embodiment of the claimed method and

Figure 4:
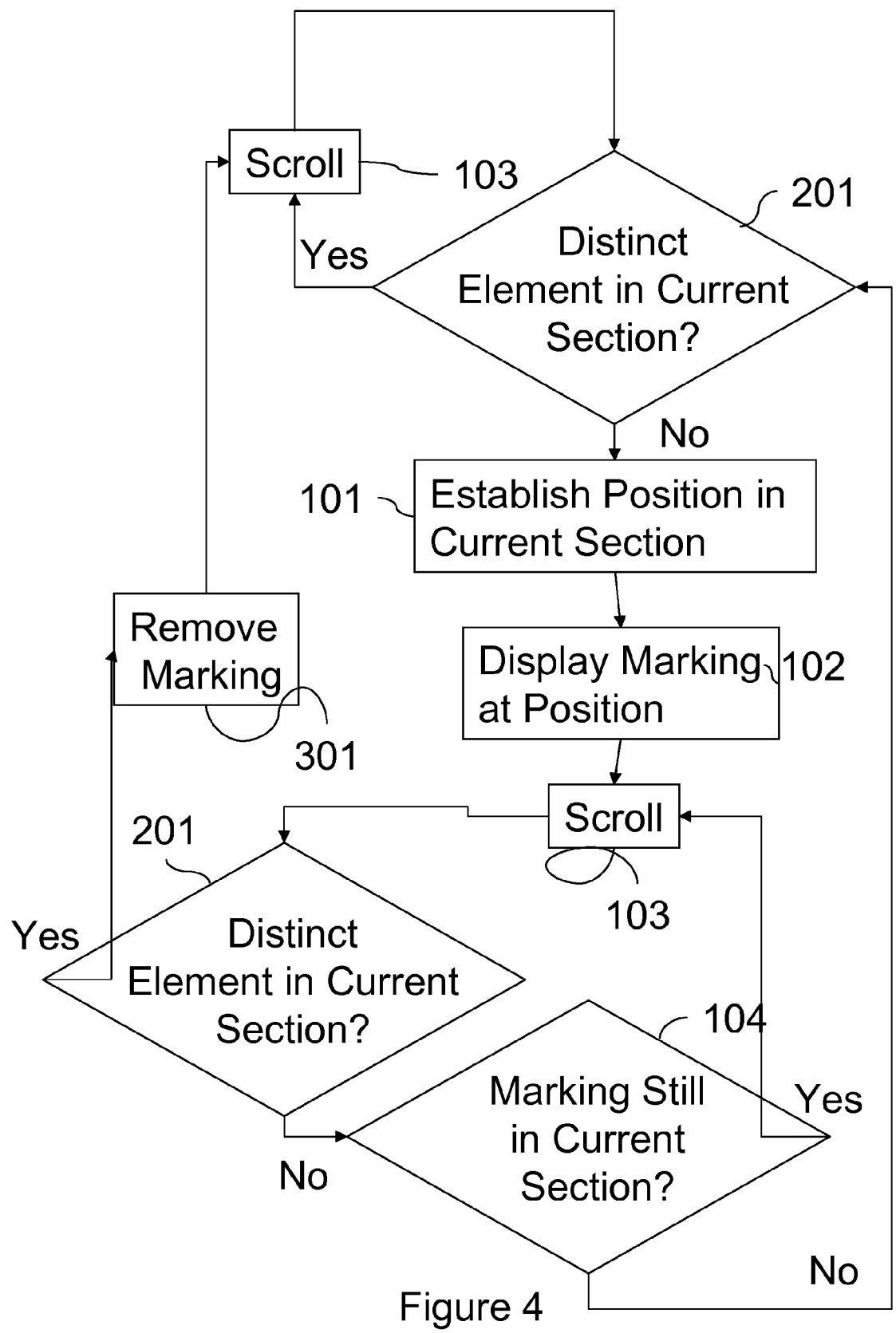

FIG. 4 a flowchart for yet another exemplary embodiment of the claimed method.

FIG. 1 shows a user 1, which delivers a scrolling command to a navigational controller 3 by means of arrow keys on a keyboard, by moving a computer mouse, by turning a scrolling wheel on a computer mouse, a joystick or the like. The user 1 can also deliver further commands to other controllers 4. The navigational controller 3 controls a section controller 5 and generates current document section information 7 with the aid of an entire document 6. The entire document 6 can be a text and/or a graphic, a virtual game world of a computer game, a photo or a CAD drawing, for example. A window controller 5 uses the current document section information 7 to force a document reproduction 8 to create a section, which is to be reproduced. The section, which is to be reproduced, is stored in a window buffer 9. The window controller 5 furthermore brings about the graphic support of the reproduction by means of a creation of a visible marking 10, for example a line, which is perpendicular to the direction of scrolling, by means of a colored or highlighted text section or by means of a star at the edge of the text and the graphic, respectively. With the aid of the entire document 6, the document reproduction 8 and the window buffer 9, a content analysis 11 then controls a section schematic, which is to be reproduced, by means of mixing and/or overlapping 12 of the section, which is to be reproduced, from the window buffer 9 comprising the visible marking. The section schematic is transferred to a display controller 13, which controls the display of the section on a display 14.

FIG. 2 shows a flowchart for an exemplary embodiment of the claimed method. During the conversion of a scrolling command, a first position within the section currently displayed in a screen window is determined in a first step for the display of a marking 101. At this position, the marking is displayed in the window 102. The window is then slightly scrolled according to the scrolling command relative to the entire document 103. The verification as to whether the marking is still within the section, which is currently displayed after the scrolling, takes place in the next step 104. Provided that the marking is still within the section currently displayed after the scrolling, the window is slightly scrolled again relative to the entire document 103, provided that the scrolling command has not yet been converted completely. However, if the marking is no longer within the section, which is currently displayed after the scrolling, a second position is then determined for the display of the marking after the scrolling of the currently displayed section 101.

Another exemplary embodiment is illustrated in FIG. 3. In this embodiment of the method, a verification is first made as to whether an entire document includes in the currently displayed section a distinct element, for example an underlined or different-colored text section, an image or a structure-rich graphic and a structure-rich graphic element, respectively, which can take over the role of an immanent marking 201. If this is the case, the window is scrolled 103, without displaying an additional marking. However, if the currently displayed section does not include a distinct element, a position, at which a marking is displayed 102, is first established in the currently displayed section 101. Only then, the window is slightly scrolled relative to the entire document 103. The scrolling is continued as long as the marking is within the section, which is currently displayed after the scrolling 104. However, if, due to the scrolling, the marking has arrived outside of the currently displayed section, the section currently displayed as a result of the scrolling is checked for the presence of at least one distinct element 201 so as to verify whether the display of a marking is necessary.

The yet another exemplary embodiment illustrated in FIG. 4 differs the other exemplary embodiment from FIG. 3 in that a displayed marking is removed again by blanking out or fading out 301, as soon as it is established that the entire document in the currently displayed section displays at least one distinct element 201.

In a further non-illustrated alternative of the exemplary embodiments from the figures, the section, which will be reproduced as a result of the next scrolling step, is analyzed instead of the currently displayed section. This makes it possible to fade in a further marking, shortly prior to the marking being scrolled out of the displayed section, so that at least one marking is always displayed.

The invention claimed is:

1. A method for visualizing a change caused by scrolling in a scrolling-direction a section of a text and/or of a graphic displayed on an optical display, said method comprising determining whether a first section displayed comprises at least one sufficiently distinctive element, and, only if said first section does not comprise any sufficiently distinctive element, displaying a visual marker at a first position within the first displayed section.

2. The method according to claim 1, further comprising determining whether a second section displayed comprises at least one sufficiently distinctive element said second section being the section displayed ere or as soon as the first section is no longer displayed due to the scrolling, and, only if said second section does not comprise any sufficiently distinctive element, displaying a visual marker at a second position within the second section displayed.

3. The method according to claim 1, further comprising using at least one Fourier-transformation parallel to the scrolling direction for determining whether a particular section displayed comprises at least one sufficiently distinctive element.

4. The method according to claim 3, the particular section displayed being made up of pixels, said method further comprising using the at least one Fourier-transformation for determining an intensity of at least one lower frequency, and comparing the determined intensity with a first threshold for determining whether the particular section displayed comprises at least one sufficiently distinctive element, wherein the at least one lower frequency has a period length in pixels, which is at least twice as large as the number of pixels of the particular section displayed during scrolling.

5. The method according to claim 1, further comprising using at least one autocorrelation parallel to the scrolling direction for determining whether a particular section displayed comprises at least one sufficiently distinctive element.

6. The method according to claim 5, the particular section displayed being made up of pixels, said method further comprising using the at least one autocorrelation for determining an intensity of at least one larger pixel distance, and comparing the determined intensity with a second threshold for determining whether the particular section displayed comprises at least one sufficiently distinctive element, wherein the number of pixel of the at least one larger pixel distance amounts to at least one twentieth of the number of pixels of the particular section displayed during scrolling.

7. The method according to claim 1, wherein the text and/or the graphic comprises characters, at least a first character in the text and/or the graphic is assigned a value and at least a second character in the text and/or the graphic is assigned the same or another value and analysis with respect to the presence of at least one sufficiently distinctive element is performed by means of the assigned values.

8. The method according to claim 7, wherein characters are displayed using a first number of pixels of a first colour and a second number of pixels of a second colour, and the value assigned to a character depends on the first number of pixels used for displaying said character and/or the second number of pixels used for displaying said character.

9. The method according to claim 8, wherein a character is assigned a fixed value unequal to zero if and only if the number of first pixels used for displaying said character is unequal to zero.

* * * * *